United States Patent Office 3,325,455
Patented June 13, 1967

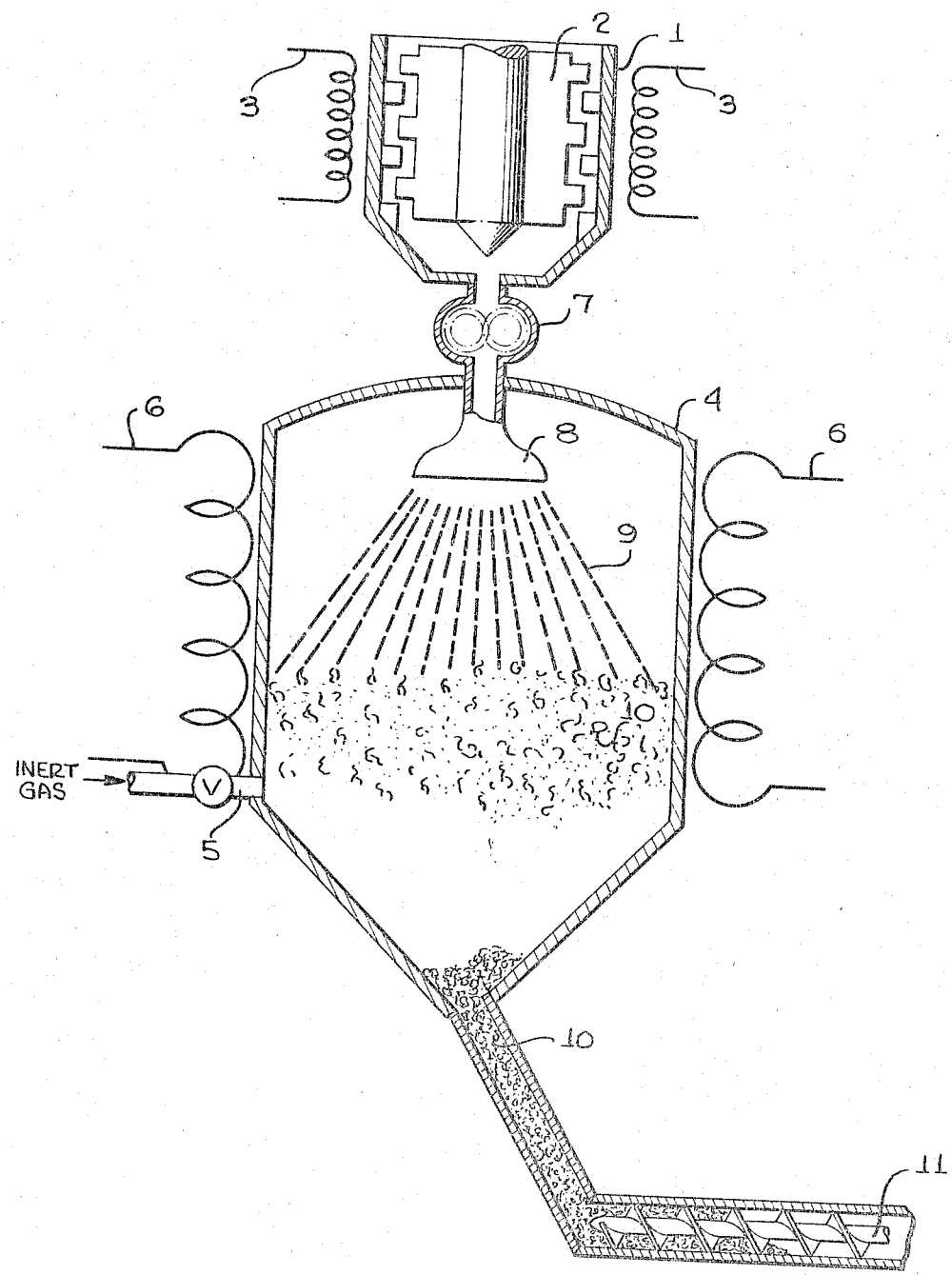

3,325,455
METHOD OF PRODUCING NYLON POWDERS
Robert E. Warner, Sinking Spring, Pa., assignor, by mesne assignments, to The Polymer Corporation, a corporation of Pennsylvania
Filed Nov. 21, 1963, Ser. No. 325,430
3 Claims. (Cl. 260—78)

This invention relates to methods and means for the production of finely divided polylactam resins. More particularly, this invention is concerned with novel methods and means for the polymerization of lactams that enables the direct conversion of higher lactam monomers to polylactams in pulverulent form.

Polylactam resins are a part of a large family of resinous materials generally designated as polyamides or, more commonly, nylons. The resins have certain rather unique properties of which their toughness and ability to risist wear are particularly outstanding. These same characteristics, however, make it quite difficult to comminute nylons to pulverulent form.

The preparation of pulverulent nylons has assumed some importance due to the commercial demand for nylon in a finely divided form. For example, nylon powders may be pressed and sintered to make various articles. Often these articles are porous and they may contain a captive fluid, as for example, oil in self-lubricated bearings and ink in self-inking ink rollers. Nyon powders may also be used to form protective coatings on articles, and are particularly suitable for use in fusion coating processes such as the fluidized bed coating process. Nylon powders have also been used in grinding compounds, they are used to provide wear resistance to softer plastics such as polyethylene, and more recently, have even been found extremely effective in the filtration of beer and wine.

For these and many other uses, it is necessary to provide nylons in pulverulent form. As mentioned above, however, this is not an easy task. Conventional grinding is often impractical due to the wear to the equipment and the high power requirements. As a result, recourse is sometimes had to dissolution and precipitation processes to avoid grinding. These processes are particularly useful if very fine particle sizes, e.g., minus 40 microns, are desired, but they are difficult to control and usually cause undesirable degradation of the molecular weight of the nylon.

Accordingly, it is an object of this invention to prepare polylactam resins in finely divided form.

Another object of this invention is to provide methods and means whereby pulverulent polylactam resins can be prepared simultaneously with the polymerization of higher lactams.

Yet another object of this invention is to provide methods and means for controlling the particle size of polylactam resins during the polymerization of higher lactams.

A further object of this invention is to provide pulverulent polylactam resins in a form suitable for use in fusion coating processes and, more particularly, in the fluidized bed coating process.

And yet a further object of this invention is to provide finely divided polylactam powders suitable for use in manufacturing pressed and sintered articles.

Briefly, the objects of this invention are achieved by spraying a reactive lactam monomer into a chamber of heated gas and polymerizing the monomer while it is in contact with the heated gas in said chamber.

This invention makes use of the low temperature anionic polymerization processes for the polymerization of higher lactams that enable the use of comparatively low polymerization temperatures, for example, below the melting point of the polylactam. In addition to these low temperature requirements, the anionic polymerization processes for the polymerization of higher lactams are useful in the practice of this invention due to their extremely rapid rate of reaction.

These low temperature processes for the anionic polymerization of lactams are disclosed, for example, in U.S. Patents 3,015,652; 3,017,391; 3,017,392 and 3,018,273. Briefly, these patents disclose the novel polymerization of higher lactams, i.e., lactams containing at least six carbon atoms in the lactam ring, as for example, e-caprolactam, enantholactam, caprylolactam, decanolactam, undecanolactam, dodecanolactam, pentadecanolactam hexadecanolactam, methylcyclohexanone isoximes, cyclic hexamethylene adipamide and the like, and mixtures thereof; in the presence of an anionic polymerization catalyst, as for example, alkali and alkaline earth metals such as lithium, sodium, potassium, magnesium, calcium, strontium, etc., either in metallic form or in the form of hydrides, borohydrides, oxides, hydroxides, carbonates, etc., organo-metallic derivatives of the foregoing metals, as well as other metals such as butyl lithium, ethyl potassium, propyl sodium, phenyl sodium, triphenylmethyl sodium, diphenyl magnesium, diethyl zinc, triisopropyl aluminum, diisobutyl aluminum hydride, sodium amide, magnesium amide, magnesium anilide, Grignard reagent compounds, such as ethyl magnesium bromide and the like; and a promoter compound such as organic isocyanates, ketenes, acid chlorides, acid anhydrides, and N-substituted imide having the structural formula $$A-N-B$$
$$\phantom{A-N}R$$

wherein A is an acyl radical such as carbonyl, thiocarbonyl, sulfonyl, phosphinyl and thiophosphinyl radicals, B is an acyl radical of the group A and nitroso, R is a radical such as A, hydrocarbyl, and heterocyclic radicals and derivatives thereof, wherein said radicals in turn can contain radicals such as carbonyl, thiocarbonyl, sulfonyl, nitroso, phosphinyl, thiophosphinyl, tert.-amino, acylamide, N-substituted carbamyl, N-substituted carbamide, alkoxy, ether groups and the like, A and B, or A and R, together can form a ring system through a divalent linking group, and any free valence bond of the A and B radicals can be hydrogen or R, excepting A directly linked thereto, and the promoter compound preferably has a molecular weight of less than about 1000.

This polymerization of the higher lactams is initiated at temperatures of from about the melting point of the lactam monomer to about 250° C., and preferably from about 125° C. to about 200° C. As the reaction is exothermic, the initiation temperature will be exceeded under most conditions. The amount of catalyst and promoter compound each can vary from about 0.1 to about 20 mole percent, preferably from about 0.5 to about 5 mole percent, and more preferably still from about 0.1 to about 1 mole percent, all based on the higher lactam being polymerized. The higher lactams preferably contain from 6 to 20 carbon atoms, and more preferably contain from 6 to 12 carbon atoms. The anionic catalyst preferably is a Grignard compound or an alkali metal and hydrides thereof. It will be understood that the anionic catalyst can be reacted in stoichiometric amount with a higher lactam to form a salt thereof, such as sodium caprolactam, and said salt can then be employed in the polymerization process in an equivalent amount to the anionic catalyst as set out herein above. This preliminary preparation is particularly desirable as it permits ready removal of hydrogen gas from the system as when sodium or sodium hydride is employed, removal of water as when sodium hydroxide is employed, removal of water and carbon dioxide as when sodium carbonate is employed, etc. Isocyanates and N-substituted imides are the preferred promoter compounds. It will be understood that the use of acid chlorides effects the presence of HCl in the system which preferably is removed therefrom to preclude reaction with the anionic catalyst, whereby extra catalyst would otherwise be required. Similarly, acid anhydrides generate organic acids, in the system which then require sufficient anionic catalyst to neutralize the organic acid in addition to the amount desired to function in the polymerization reaction.

The drawing is a somewhat schematic view, partly in section, of a suitable device for practicing this invention. Mixing vessel 1 is provided with agitation means 2 to prepare the reactive lactam monomer. The term reactive lactam monomer is used herein to mean a lactam monomer containing both a catalyst and a promoter, and thus may be readily polymerized when the mixture is raised to polymerization temperatures. The mixing vessel 1 is in heat exchange relationship with heating element 3 whereby the temperature and contents of mixing vessel 1 may be controlled.

Reactive lactam monomer is discharged from mixing vessel 1 into reaction vsesel 4 via pump 7 and a spray nozzle 8. Reaction vessel 4 is provided with heating element 6, valved gas conduit means 5, solids discharge conduit 10, and solids impeller means 11. Usefully, gas outlet means (not shown) may be provided adjacent the upper portion of the reaction vessel 4.

In operation, a higher lactam, a promoter and a catalyst are introduced into mixing vessel 1 and dispersed by agitator 2. The temperature of the reactive mixture is maintained above the melting point of the lactam, but below those temperatures at which rapid polymerization will take place. This reactive mixture is then forced by the action of pump 7 through nozzle 8 and sprayed as fine drops into the upper region of reaction vessel 4. The temperature of reaction vessel 4 is adjusted to be high enough so that the sprayed drops of reactive monomer will immediately commence rapid polymerization upon contact with the heated gases in the reaction vessel. Advantageously, heat exchange means (not shown) may also be included within nozzle means 8 in order to raise the temperature of the reactive mixture to or approaching polymerizing temperatures just prior to introducing the monomer into the reaction vessel 4.

The gas contained within the reaction vessel 4 must be comparatively inert with respect to the polymerization reaction and, particularly, must be free from moisture. Many dry gases may be used, and nitrogen, carbon dioxide, argon and neon are examples of commonly available industrial gases that will perform satisfactorily.

It is, of course, essential that the polymerization take place as rapidly as possible in order that the polymerization of the sprayed drops may be fairly well completed during their descent to the bottom of the reaction chamber 4. At least the polymerization during this time should be sufficient to yield solid particles that are form stable and will not stick excessively to each other.

In addition to providing a high reaction vessel, other means may be utilized to provide more time for the descent of the sprayed drops through the reaction vessel 4. For example, the sprayed drops may be contacted in countercurrent relationship with an uprising stream of gas. This uprising stream of gas will hinder the free fall of the particles and, if desired, its velocity may be increased to the point where the particles will be suspended or fluidized by this gas stream. While means for providing such fluidization are not shown in the drawings, it is well known that this readily may be accomplished by providing a porous plate adjacent the lower portion of reaction vessel 4 and introducing inert gas under pressure beneath this porous plate. Suitable solids overflow devices, also well known in the art, may be installed adjacent the lower portion of the reaction vessel to enable discharge of the polymerized polylactam particles. This fluidized bed method of operation is also sometimes advantageous since it enables ready control over the average detention time of particles within the reaction vessel. This may be helpful in controlling the size, shape and degree of polymerization of the particles.

It also can be readily understood that the time the sprayed drops are dispersed within the hot gases can be increased if the particles are sprayed in at the bottom of the vessel with a substantial vertical component and collected on the other side of the vessel. By providing such a trajectory for the sprayed particles, it is apparent that the contact time with the gases materially will be increased.

Control of the size of the polymerized fine particles can be obtained by adjusting the size of the orifices on nozzle 8 as well as the pressure imposed on the material being sprayed therethrough. Also, as mentioned with respect to a fluidized bed, control of the ultimate size of the particles may be obtained to some degree by the detention time of the particles within the reaction vessel.

*Example I*

A $1/400$ molar quantity of sodium hydride catalyst and a $1/200$ molar quantity of tolylene diisocyanate promoter were added to 20 kgm. of epsilon-caprolactam. The mixture was heated to about 150° C. and sprayed into the tank containing nitrogen heated to a temperature above 190° C. The spray diffused through the insert heated gas and polymerized to solid particles of nylon.

*Example II*

A reactive lactam mixture was prepared using epsilon-caprolactam and $1/200$ mole of sodium hydride catalyst and $1/200$ mole of a toluene diisocyanate promoter. The mixture was heated to 150° C. and sprayed into an inert gas headed to 160° C. This resulted in a fine powdered nylon.

As this invention may be embodied in several forms without departing from the spirit or essential characteristics thereof, the present embodiment is therefore illustrative and not restrictive since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:
1. A process of producing polylactams in pulverulent form comprising the steps of:
    preparing a polymerizable mixture comprised of a higher lactam, an anionic catalyst for the polymerization of such lactam, and a promoter compound effective to include rapid polymerization of such lactam;
    heating said mixture to a temperature intermediate the melting point of such mixture and the temperature at which rapid polymerization of the mixture will take place;
    spraying a continuous stream of said mixture in the form of small liquid droplets into a reactor;
    suspending said droplets in a substantially moisture-free gas that is inert to the polymerization reaction and is heated to a temperature intermediate the temperature at which rapid polymerization will take place and the melting point of the polyactam produced;

polymerizing said droplets to form finely divided solid particles while suspended in said gas; and discharging said finely divided solid particles from said reactor.

2. A process according to claim 1 in which said mixture is heated to a temperature between about 70° C. and about 150° C.

3. A process according to claim 1 in which said inert gas is heated to a temperature in a range of from about 160° C. to about 200° C.

References Cited

UNITED STATES PATENTS

| | | | |
|---|---|---|---|
| 2,907,755 | 10/1959 | Lautenschlager et al. | 260—78 |
| 3,017,391 | 1/1962 | Mottus et al. | 260—78 |
| 3,216,977 | 11/1965 | Browns | 260—78 |
| 3,228,759 | 1/1965 | Small et al. | 260—78 |

WILLIAM H. SHORT, *Primary Examiner.*

H. D. ANDERSON, *Assistant Examiner.*